June 27, 1972          H. J. VIRNIG          3,672,916
FOOD TRAY HAVING A LAMINATED CLOSURE THAT IS HEAT-RETRACTABLE
Filed Aug. 31, 1970          2 Sheets-Sheet 1
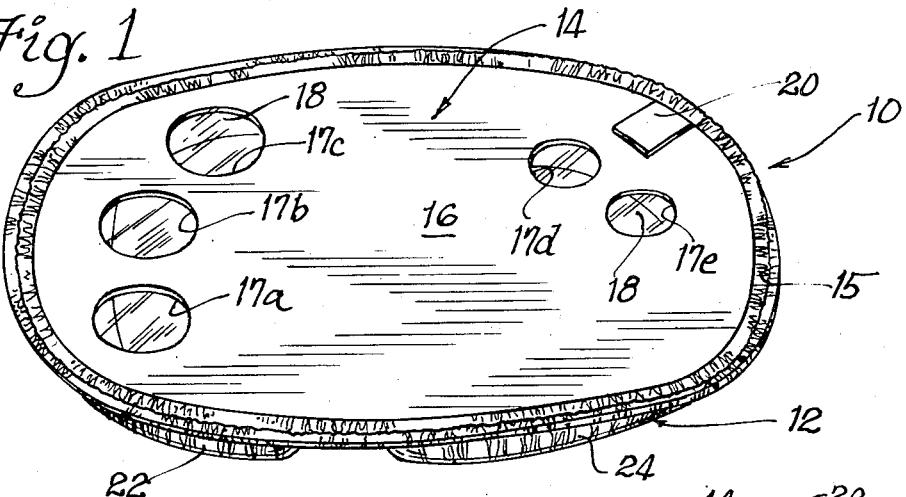
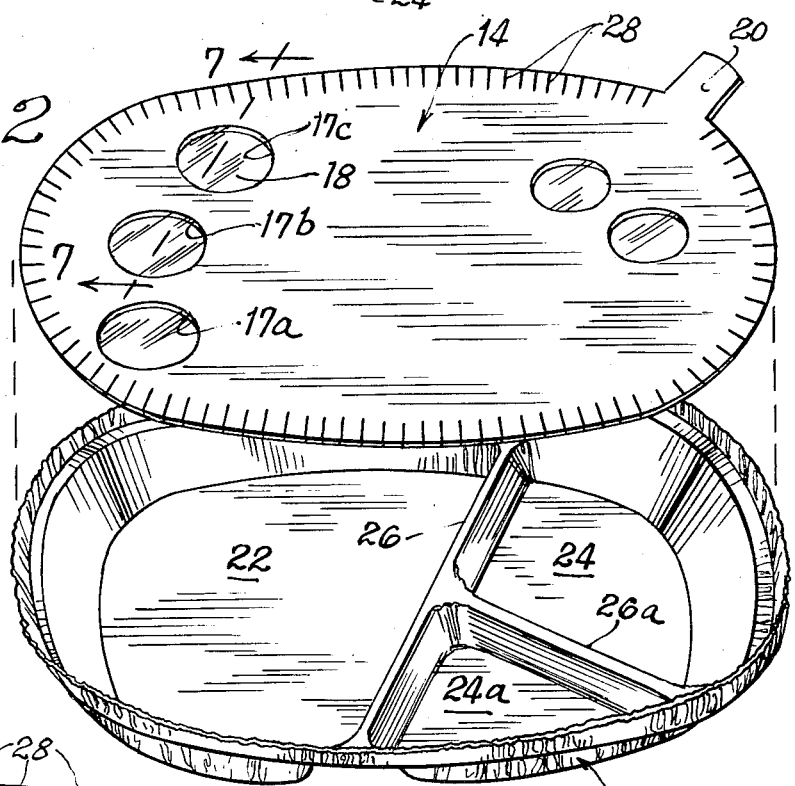
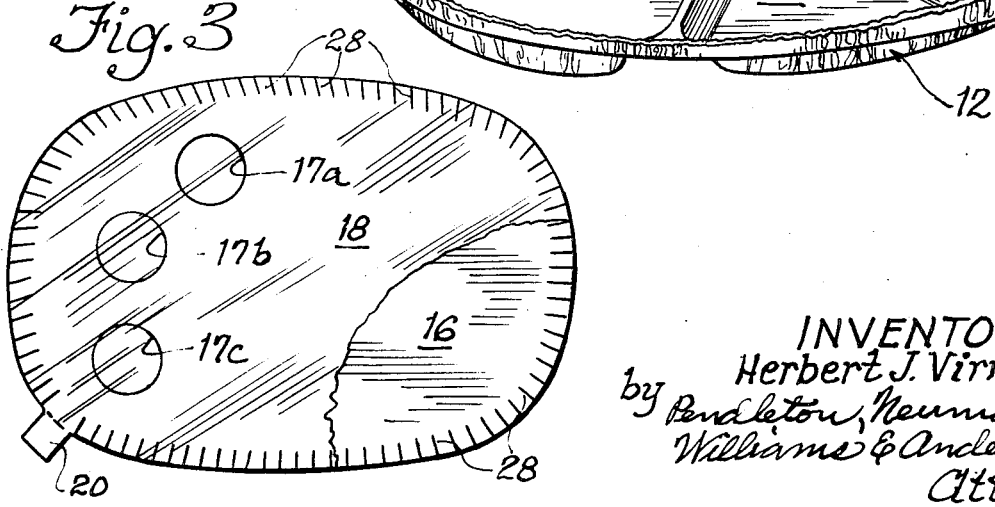
INVENTOR
Herbert J. Virnig
by Pendleton, Neuman
Williams & Anderson
Att'ys

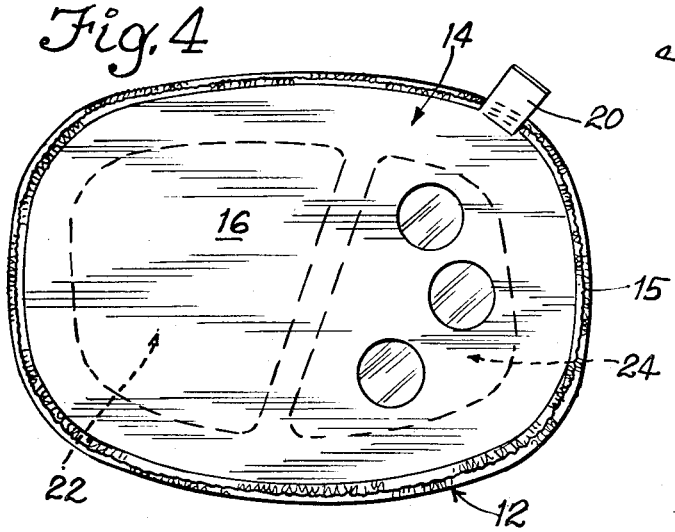
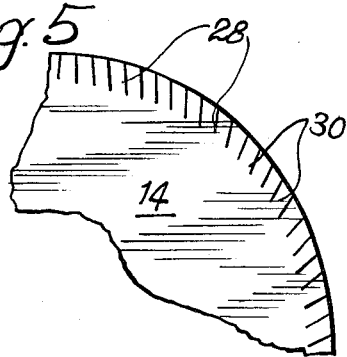
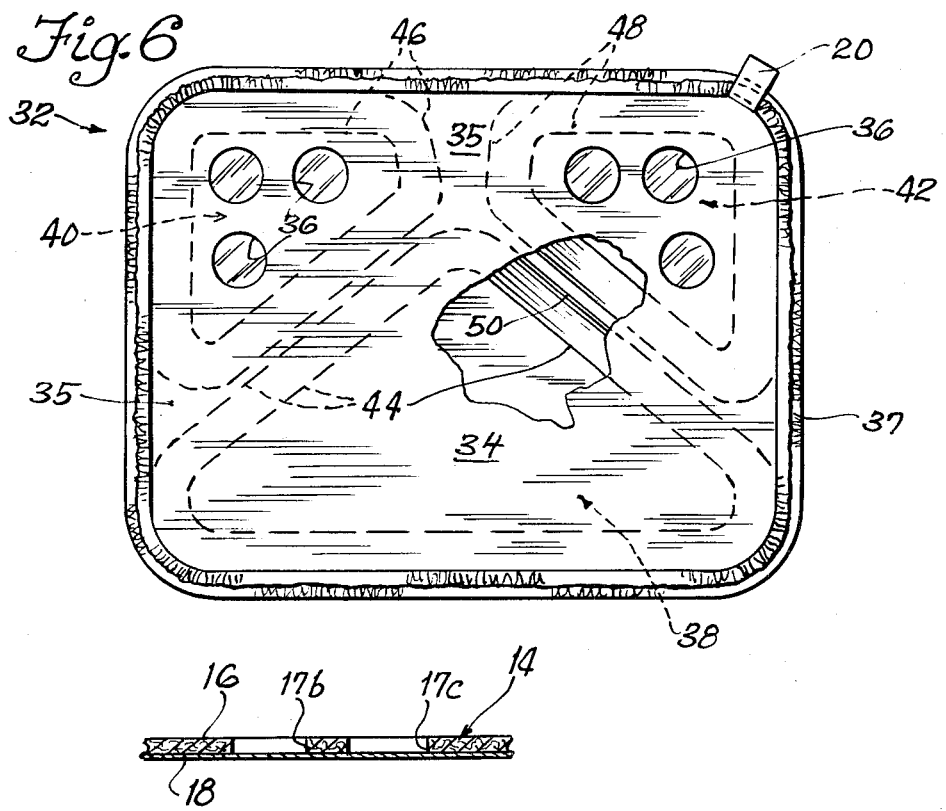

United States Patent Office 3,672,916
Patented June 27, 1972

3,672,916
FOOD TRAY HAVING A LAMINATED CLOSURE
THAT IS HEAT-RETRACTABLE
Herbert J. Virnig, Hanover Park, Ill., assignor to Mass
Feeding Corporation, Elk Grove Village, Ill.
Filed Aug. 31, 1970, Ser. No. 68,432
Int. Cl. B65b 25/22
U.S. Cl. 99—171 H                10 Claims

ABSTRACT OF THE DISCLOSURE

A food container comprising a tray portion and a complementary closure member, said closure member comprising in sheetlike laminated form, a sheetlike support member of relatively heat insensitive material having one or more apertures of predetermined size formed therein and a film member of heat sensitive thermoplastic polymeric material secured and laminated to one surface of said support member and extending over said aperture or apertures providing a moisture vapor barrier in said closure member which is heat reactive at normal cooking oven temperatures.

BACKGROUND OF THE INVENTION

Field of the invention

This invention relates to food containers and more particularly to food containers in tray form having a tray portion adapted to the holding of food in the frozen state such as precooked dinners or the like which are intended to be thawed, heated and/or cooked prior to serving. The container includes a closure member in self-supporting sheetlike form having moisture vapor barrier properties and having a portion thereof responsive to heat of the magnitude ordinarily obtained in cooking ovens to fracture the moisture vapor barrier and permit dehydration of the food contents during an oven heating cycle.

Description of the prior art

The prior art relating to this invention includes a variety of so-called T.V. dinner trays which are adapted to hold or contain pre-cooked or partially cooked or even raw foods in the frozen state which are heated by placing in an oven just prior to serving. These trays customarily include a cover portion secured to the tray by crimping at the edges thereof. The purpose of the cover is to prevent dehydration or freezer burn of the food contents during frozen storage, which of course would make the food unpalatable and unacceptable from the consumer point of view. The cover is frequently left in place on the frozen food container during the heating step.

One of the problems associated with such T.V. dinners is that where two or more types of frozen food are included, they frequently require different heating conditions preparatory to serving. Thus, some foods require a steaming or heating in a chamber closed to the oven atmosphere to produce a moist palatable product while other foods require (desirably) exposure to the oven atmosphere with some dehydration, crisping or browning of the food product to produce a gustatorially satisfactory product. Examples of the latter would be french fries, french fried onion rings, fish sticks, breaded or toasted products or the like.

One approach to such problems has been to provide markings on a thin aluminum foil cover indicating to the consumer to break the foil and fold back the same to expose the particular food item to the oven atmosphere.

Another approach is set forth in the disclosure of Stephenson, U.S. Pat. No. 3,410,697, patented Nov. 12, 1968. In this disclosure a large window is provided in a paperboard base cover member. The window is a film of heat sensitive plastic material which upon heating exercises a so-called plastic memory and retracts or shrinks from the unsupported area or window aperture to the edges thereof. The film is also termed heat retractable and oriented.

One of the problems that has been found to be associated with the construction shown in the Stephenson patent is that upon exposure to heat the film does indeed fracture and retract to the extent of its plastic memory but the fracture is random and the expanse is so great as to preclude any assurance that the film will completely withdraw from the window area. Thus, normal imperfections in the film are such as to provide an area where a heat fracture initiates. This heat fracture point can be any location on the film expanse such as for example close to an edge or more particularly adjacent to the aperture in the paperboard base sheet which forms the support for the plastic film window. Under such circumstances if a film inherently has the capacity for retraction of say 50%, a window expanse of 2½ or 3 inches would provide a retraction of about 1¼ to 1½ inches. This of course would leave part of the film over the aperture which on direct exposure to the oven atmosphere heat would tend to melt and sag onto the food and in some cases fall entirely away from the cover and contaminate the food.

One expedient which was employed to alleviate this problem was to provide an unnatural or artificial flaw in the surface of the film window. This flaw was centrally located in the film and had as its purpose to provide a central focal point at which the film would fracture and from which the film would withdraw on exposure to heat. Thus, a film which would have the degree of orientation necessary to retract say 1 or 1¼ inches from the flaw in a 2½ or 3 inch expanse would be almost completely withdrawn from the window area if the point from which the withdrawal took place was centrally located in the window area. While this expedient did aid in producing a more satisfactory product and was an improvement over the use of unflawed oriented films used in large expanse windows, there was still some difficulty in producing uniformly good results. First, the introduction of the flaw was an added operation. Second, the expanse was such that normally a fair percentage of containers would, due to the variations in degree of orientation of the film and the percentage of retained plastic memory, produce a film that would drag on the surface of the food product or fall off the sheet in the heated state and contaminate the product thereby being commercially unacceptable as a product.

Summary of the invention

This invention relates to frozen food containers and more specifically to a frozen food container comprising a tray portion and a complementary cover portion in sheetlike laminated form, said closure member including a relatively heat resistant self-supporting substrate sheet member having at least one aperture formed therein in a predetermined location and a film of thermoplastic polymeric material adhered and united to one surface of said substrate member and spanning said aperture to provide a continuous moisture vapor barrier essentially the extent of said substrate member.

The aperture provided in the substrate of the closure member is of a diameter or size such that the withdrawal of the oriented film upon exposure to heat is sufficient in extent to result in at least 85 percent of the aperture in said substrate being open to the oven atmosphere. Preferably 90 to 95% or more of the said aperture opens on heating to said oven atmosphere. The aperture is essentially free of any portion of the film originally spanning said aperture depending from the edges thereof onto food contained in the tray portion and no melting and falling of the film into the food in said tray occurs.

Generally, it has been found that for proper functioning the apertures employed herein should be about 1 inch in diameter although diameters of up to about 1¼ inches have been found satisfactory. Of course smaller apertures can be employed such as for example ½ to ¾ inch. The configuration of the aperture is preferably round, although other shapes such as oval, square, hexagonal, rectangular or the like may be employed provided the longest dimension thereof does not exceed about 1¼ inches.

The number of apertures should be at least one; however it has been found that three are preferred and 3 to 5 are most preferred. The apertures are grouped in the cover member to correspond with tray portion sectors normally formed in the body of the tray material. Most commonly the tray material is formed from aluminum sheet or heavy foil of sufficient rigidity to be self-supporting at all stages during use. The apertures are conventionally grouped over the food in the tray portion which customarily requires dehydration during the cooking step.

The heat retractable oriented polymeric film material used in the construction of the present invention is of the type that exhibits elastic or plastic memory when exposed to normal oven temperatures. This includes films such as polyethylene or polypropylene and films which are sufficiently oriented or display sufficient plastic memory so as to withdraw in accordance with the aforesaid standards from apertures of up to 1¼ inches in their longest dimension. Retraction generally takes place with, for example, low molecular weight, low density polyethylene of temperatures of 180° F. or below. Ordinarily, the ovens used in the instant invention have atmosphere temperatures ranging from about 350 to 400° F. Other polymeric materials which may be used, although not preferred materials, are heat retractable polyvinylchlorides, polystyrene or other thermoplastic films exhibiting these properties.

The method of bonding the films to the cellulosic or paperboard substrate may vary and may include hot melt or heat lamination or use a suitable non-toxic adhesive acceptable for food preparation. The adhesive is generally applied to the paperboard sheet so as to adhere the film overlay over essentially the entire surface of the substrate to provide a moisture vapor barrier. The film is generally considered to be on the inner surface of the cover, that is, the surface of the cover whose face is directed toward the food within the container.

Brief description of the drawings

For a more complete understanding of the present invention reference is made to the attached drawings wherein:

FIG. 1 is a perspective view of the assembled food container of the present invention showing the cover portion in place on the tray member;

FIG. 2 is a composite exploded view of the disassembled container of FIG. 1;

FIG. 3 is a bottom plan view of an alternate embodiment of the cover portion disclosing a cover employing three apertures;

FIG. 4 is a top plan view of an assembled container employing the alternate embodiment cover of FIG. 3 and showing the configuration of the tray bottom by hidden lines;

FIG. 5 is an enlarged fragmentary view of a portion of the cover portion detailing the scored edges thereof;

FIG. 6 is a top plan view of a still further embodiment of the present invention using a rectangular tray and cover; and FIG. 7 is a partial cross sectional view of the cover portion taken along the line 7—7 of FIG. 2.

Referring specifically to FIG. 1 of the drawing there is illustrated an assembled food container 10 comprising a tray 12 and a closure portion 14 affixed to the tray by means of an integrally formed crimped edge 15 of tray 12. As illustrated, the closure portion 14 comprises a paperboard substrate of sheet 16 having formed therein a plurality of apertures 17a through e. Also illustrated is a plastic film 18 spanning the apertures 17. A tab 20 is provided as an integral part of the cover unit for easy removal of the same from the tray unit.

Referring to exploded view, FIG. 2, the cover 14 is shown as removed from the tray 12. Compartments 22, 24 and 24A are shown in the tray 12 which are separated by divider walls 26 and 26A which is integrally formed as a part of the tray 12. As indicated in the foregoing, the tray may be suitably formed of aluminum of a light weight sheet or heavy gauge foil type. In FIG. 2 and FIG. 3 there are illustrated a plurality of score marks 28 or slashes in the periphery of the cover portion 14 which are for the purpose of facilitating removal of the cover from the crimped edge 15 of the tray 12 after use. The slash marks or scorings 28 provide a weakened edge area of the cover 14 that is readily deformable when one pulls the cover by its tab 20 away from the tray container preparatory to serving.

In use one would place the food components in the tray sectors 22 and 24 assuming that both would require dehydration for proper preparation from the frozen state prior to serving. In this case the cover embodiment illustrated in FIG. 1 and FIG. 2 would be employed. In the event that only one food portion would require dehydration prior to serving, the cover embodiment illustrated in FIG. 3 would be employed.

FIG. 4 illustrates in top plan view an assembled food tray of the type shown in FIG. 1, employing, however, the cover of FIG. 3. The form of the trays 22 and 24 are illustrated by broken hidden lines 22A and 24A.

FIG. 5 is a fragment of the edge of the cover of FIG. 1 showing score marks 28 defining a plurality of fingers 30 at the periphery of cover 14 which fingers are ordinarily gripped by the crimp edge 15 and by virtue of their ready deformability are bendable to permit easy removal of cover 14 from under integrally formed crimp edge 15 of tray 12.

FIG. 6 illustrates a further embodiment of this invention having a rectangular tray 32 and associated cover 34 comprising substrate 35 formed of paperboard and window 36. The tray also has a crimp edge 37 which overlies the edge or rim of cover 34. The trays 38, 40 and 42 are shown by hidden lines 44, 46 and 48 respectively with an integral separator wall 50 formed as a part of the tray 32.

FIG. 7 is the fragmentary cross-sectional view of the cover 14 of FIG. 2 showing the paperboard substrate 16 and film 18 spanning apertures 17b and 17e.

The plastic or polymeric films used in the foregoing food container constructions are as indicated thin films of polyethylene or polypropylene which display plastic memory. Preferably, the films are oriented or most preferably bi-axially oriented films which display shrinkage in both directions planar to the film sheet surface. Suitable materials include films of a thickness of from about 0.5 to 2.5 mils. A melt index of from .7 to 1.5 for polyethylene films is suitable. Polypropylene films sold under the trademark designations Profax 3X100 and Profax 3502 for example are also suitable.

Adhesives employed to laminate the film to the paperboard substrate include polyvinyl acetate or polyvinyl acetate-butyrate emulsions.

In manufacture, the adhesive is preferably applied to the pre-cut paperboard substrate.

In use, frozen food items which have been pre-cooked are placed in the trays and the covers affixed so that the windowed apertures appear over those food items which require browning. Of course, in mass production systems the placement of the food in the proper tray portions must be coordinated with the proper cover selection. The packaged frozen food is stored either at the warehouse or at the point of use in freezers to maintain the food in the frozen state. The film forms a moisture proof barrier to prevent dehydration or freezer burn during storage. When ready for use, the containers and food contained therein are removed from storage and placed in a preheated 350–400° F. oven. The regular heating cycle of the oven is then initiated. The oven heat causes the plastic film to soften and melt and by virtue of exhibiting plastic memory, retract or withdraw to the edges of the apertures, thereby exposing the food in the compartment immediately thereunder to the oven atmosphere. Exposure to the oven atmosphere permits dehydration and some browning or crisping of the food products during the heating cycle while those food items in other tray compartments are heated and kept relatively moist. French fries and french onion rings are good examples of food products which benefit from dehydration and browning during the cycle.

Tests have established that the trays of the present invention operate more satisfactorily than those of the prior art, especially in respect to essentially complete withdrawal of the film from the aperture. Furthermore, the relatively small size of the apertures is such as to minimize puncture or damage from handling prior to actual use since the unsupported film span is relatively small.

What is claimed is:

1. A food container comprising a tray portion adapted for holding food contents therein which require dehydration, crisping or browning during cooking, and a complementary closure member, said closure member comprising a sheetlike substrate support member of relatively heat resistant material at normal cooking temperatures having at least one aperture formed therein in a predetermined location in relation to food contents in said tray which requires dehydration, crisping or browning, said aperture having an opening span of up to about 1¼ inches and a thermoplastic polymeric film laminated to one surface of said substrate and spanning said aperture to provide a continuous moisture vapor barrier essentially the extent of said substrate member, said polymeric film being characterized as self-fracturing and retracting under the influence of ordinary oven cooking conditions to retract from said aperture and expose the food contents in the tray associated with said aperture to the oven atmosphere, the size and number of said apertures being sufficient to permit dehydration, crisping or browning of the food contents in said tray associated with said apertures.

2. A food container according to claim 1 wherein the polymeric film is a non-toxic food grade packaging film.

3. A food container according to claim 2 wherein the film is selected from the group consisting of polyethylene and polypropylene.

4. A food container according to claim 1 wherein the cover portion has a plurality of apertures formed in said substrate.

5. A food container according to claim 1 wherein the cover portion is formed of paperboard.

6. A food container according to claim 1 wherein said tray is compartmented into at least two compartments and said cover has a plurality of apertures formed in the substrate in predetermined locations so as to permit dehydration of selected food items in the tray compartments immediately thereunder.

7. A food container according to claim 1 wherein the plastic film has a thickness of from 0.5 to about 2.5 mils.

8. A food container according to claim 1 wherein the film is a biaxially oriented polymeric film of polyethylene or polypropylene.

9. A food container according to claim 1 wherein the film is adhesively united to a paperboard substrate in the cover construction.

10. A food container according to claim 1 wherein the cover has a plurality of score marks on the peripheral edges thereof forming a plurality of deformable finger units therein.

References Cited

UNITED STATES PATENTS

| 3,547,661 | 12/1970 | Stevenson | 99—171 H |
| 3,410,697 | 11/1968 | Stephenson | 206—45.31 X |
| 3,219,460 | 11/1965 | Brown | 99—174 UX |

FRANK W. LUTTER, Primary Examiner

S. L. WEINSTEIN, Assistant Examiner

U.S. Cl. X.R.

99—171 CT, 171 LP; 206—45.31; 229—43